United States Patent
Bruhn et al.

(10) Patent No.: US 10,408,106 B2
(45) Date of Patent: Sep. 10, 2019

(54) CONTAINER FOR A LIQUID OPERATING MEDIUM OF A MOTOR VEHICLE AND MOTOR VEHICLE WITH SUCH A CONTAINER

(71) Applicant: Bayerische Motoren Werke Aktiengesellschaft, Munich (DE)

(72) Inventors: Andreas Bruhn, Puchheim (DE); Markus Wolf, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 46 days.

(21) Appl. No.: 15/682,748

(22) Filed: Aug. 22, 2017

(65) Prior Publication Data

US 2017/0350296 A1   Dec. 7, 2017

Related U.S. Application Data

(63) Continuation of application No. PCT/EP2016/052279, filed on Feb. 3, 2016.

(30) Foreign Application Priority Data

Mar. 11, 2015   (DE) .................. 10 2015 204 353

(51) Int. Cl.
    *F01N 3/20*   (2006.01)
(52) U.S. Cl.
    CPC ........ *F01N 3/2066* (2013.01); *F01N 2610/02* (2013.01); *F01N 2610/10* (2013.01);
    (Continued)

(58) Field of Classification Search
    CPC ............. F01N 3/2066; F01N 2610/02; F01N 2610/10; F01N 2610/1406; F01N 2610/1433; Y02A 50/2325; Y02T 10/24
    See application file for complete search history.

(56) References Cited

U.S. PATENT DOCUMENTS

| | | | |
|---|---|---|---|
| 2011/0056961 A1* | 3/2011 | Amtmann | F01N 3/2066 220/592.01 |
| 2011/0232271 A1 | 9/2011 | Haeberer | |

(Continued)

FOREIGN PATENT DOCUMENTS

| | | |
|---|---|---|
| DE | 10 2009 000 094 A1 | 7/2010 |
| DE | 10 2009 046 969 A1 | 5/2011 |

(Continued)

OTHER PUBLICATIONS

International Search Report (PCT/ISA/210) issued in PCT Application No. PCT/EP2016/052279 dated May 10, 2016 with English translation (Four (4) pages).

(Continued)

*Primary Examiner* — Brandon D Lee
(74) *Attorney, Agent, or Firm* — Crowell & Moring LLP

(57) ABSTRACT

A container is provided for a liquid operating medium of a motor vehicle. The container includes: i) an outer container which forms a container volume; ii) at least one heating device which is designed to thaw frozen operating medium, and iii) a partition which divides the container volume into a proximal region and a distal region. The proximal region is arranged closer to the at least one heating device than the distal region. The partition is designed to let through more operating medium between the proximal region and the distal region in the installation position of the container than in an oblique position of the container.

16 Claims, 3 Drawing Sheets

(52) U.S. Cl.
CPC ............... *F01N 2610/1406* (2013.01); *F01N 2610/1433* (2013.01); *Y02A 50/2325* (2018.01); *Y02T 10/24* (2013.01)

(56) References Cited

U.S. PATENT DOCUMENTS

2012/0237414 A1   9/2012   Haeberer
2012/0311999 A1   12/2012  Hodgson et al.
2014/0245726 A1   9/2014   Maguin et al.

FOREIGN PATENT DOCUMENTS

DE   10 2011 118 652 A1   5/2013
EP           2 299 079 A1   3/2011
EP           2 706 208 A1   3/2014
WO   WO 2011/085830 A1    7/2011

OTHER PUBLICATIONS

German-language Written Opinion (PCT/ISA/237) issued in PCT Application No. PCT/EP2016/052279 dated May 10, 2016 (Five (5) pages).
German-language Search Report issued in counterpart German Application No. 10 2015 204 353.3 dated Nov. 12, 2015 with partial English translation (Eleven (11) pages).

* cited by examiner

CONTAINER FOR A LIQUID OPERATING MEDIUM OF A MOTOR VEHICLE AND MOTOR VEHICLE WITH SUCH A CONTAINER

CROSS REFERENCE TO RELATED APPLICATIONS

This application is a continuation of PCT International Application No. PCT/EP2016/052279, filed Feb. 3, 2016, which claims priority under 35 U.S.C. § 119 from German Patent Application No. 10 2015 204 353.3, filed Mar. 11, 2015, the entire disclosures of which are herein expressly incorporated by reference.

BACKGROUND AND SUMMARY OF THE INVENTION

The technology disclosed here relates to a container for a liquid operating medium of a motor vehicle and also to a motor vehicle with such a container.

On account of exhaust emissions legislation, in motor vehicles with an internal combustion engine, among other things the pollutant NOx has to be reduced. A method which is used is the "selective catalytic reduction" (SCR) method, in which the pollutant NOx is reduced with the aid of a liquid reducing agent to form N2 and H2O. For this purpose, a pump conveys the reducing agent via a line from a container to a metering module. The aqueous urea solution generally used as the reducing agent freezes at $-11°$ C. and therefore has to be thawed at low temperatures by a heater. Since a punctiform heater reaches the edge areas of the tank only poorly, if at all, it has been attempted to increase the thawing power by a flat heater which is spread out in the interior of the tank in the vicinity of the bottom. A problem here is that the frozen reducing agent, in particular in the case of a full tank, constitutes a very large ice mass. The heater can then thaw the ice in the region of the heater only in the event of a high surface temperature. At a low heating temperature, the heating power as a result of the outflow of heat into the large ice mass is no longer sufficient to melt the ice remote from the heater. Although the large ice mass warms up somewhat, the heating power is too low for general thawing.

It has therefore been proposed in DE 10 2009 046 969 A1 to partition off the heater from the overall ice quantity by a plastics cup. The ice is thawed here by a heater in the cup, and the heat generated by the heater cannot escape into the large ice mass outside the plastics cup because of the insulating effect of the cup wall. In order also to be able to liquefy the ice outside the plastics cup, the cup has openings in its lower region, through which the heated liquid can act upon the ice which is located in the bottom region outside the cup. In order to make the input of heat from the warm liquid into the ice more efficient, the outer region above the openings is thermally partitioned off from the overall ice mass by an insulating collar. The heat can be transmitted via the openings to the ice below the insulating collar by sloshing of the liquid in the driving mode.

When a vehicle is parked on a slope, the already liquefied operating medium can flow out of the plastics cup or insulating collar through the openings in the plastics cup and in the insulating collar and can freeze in distal regions between the container wall and the ice. As a result, the quantity of ice in the distal regions can increase, in particular since the insulating collar prevents the input of heat to said ice layers.

If the SCR system is then put into operation again when the tank is frozen, there is insufficient liquid operating medium in the container for the start of the SCR system. Furthermore, the heating device may not be in contact with the operating medium since the previously liquid operating medium has frozen in the distal regions. A chamber without operating medium then forms on the container flange. The heating device cannot then efficiently thaw the ice since the operating medium, as a medium for transmitting heat, is missing. On the contrary, the heating device may initially have to melt some of the surrounding ice by heat radiation. A considerable time delay therefore occurs. A time delay during the starting up of an SCR system is permitted only to a limited extent according to the current legal position in Germany. For example, legislation currently (2015) prescribes that the SCR system has to be ready for metering within 20 minutes. In addition to the considerable time delay, the heating device or the container can also be damaged by this unintended type of use. When a vehicle is parked on a slope, the contents of the tank preferably can no longer flow away from the heating device. A sufficient amount of additive remains in the region of the heater in order to ensure sustained thawing.

In previously known SCR systems, the operating medium is supplied to the container in distal regions. The filling pipes therefore end in distal regions in which the operating medium is thawed only with a considerable time delay. If the end of the filling pipe has frozen, the operating medium cannot be supplied.

It is an object of the technology disclosed here to reduce or to eliminate the disadvantages of the previously known solutions.

In particular, it is an object to make an operating medium available more rapidly again when motor vehicles are parked on a slope, without expensive (electric, electronic or mechanical) devices being required for this purpose. Furthermore, it is an object of the technology disclosed here safely and simply even in winter to provide a container for easily freezing operating medium, which container can be refilled even at low temperatures.

The technology disclosed here relates to a container or storage container for a liquid operating medium of a motor vehicle. The operating medium can be, for example, an operating medium which freezes at ambient temperatures of up to $-30°$ C., in particular additives (e.g. reducing agent). For example, the reducing agent can be a urea-water solution. For exhaust gas purification, a 32.5% strength urea-water solution is obtainable under the trade name Adblue®. Such a reducing agent freezes below minus $11°$ C. The operating medium can be, for example, a cleaning liquid of window or headlamp wash systems in motor vehicles. Antifreeze agent is added to said cleaning liquids. However, the antifreeze agent only reduces the freezing point of the window wiping water to approx. $-17°$ C. to $-20°$ C., and therefore, despite antifreeze agent, the liquid may solidify at temperatures of below $-20°$ C. in the container and in the lines of the window wash system.

The container comprises an outer container which forms, surrounds or delimits a container volume. The container volume is the volume for the liquid operating medium in the container, wherein an air layer is generally provided in the upper region of the container volume.

At least one heating device which is designed to thaw the frozen operating medium is provided in the container. The heating device is preferably provided adjacent to the container flange or adjacent to the operating medium outlet of the container. Any device which is suitable for thawing the frozen operating medium can be provided as the heating device. Resistance heaters or PTCs (positive temperature coefficient) in the form of a heating brick or heating film are often provided for this purpose. The heating device is formed adjacent to the operating medium outlet so that, in the event of a frozen container, liquid operating medium is initially generated directly at the operating medium outlet.

The technology disclosed here furthermore comprises a container with a partition. The partition can divide the container volume into a proximal region (first region) and a distal region (second region) (for simplification below only the terms "proximal region" and "distal region" are used). The proximal region can be arranged closer to the at least one heating device than the distal region. In this connection, the entire region should be considered in each case and it is not ruled out that a partial region of the at least one heating device may run through the distal region. The heating device is preferably completely arranged in the proximal region. The partition by itself or together with an outer wall region of the outer container can surround the at least one heating device.

The partition can be designed as a hydrostatic loop. A hydrostatic loop is a device which, in a first (starting) position, permits the flow of operating medium from a first region to a second region, whereas the hydrostatic loop reduces or prevents this flow in a second (oblique) position dissimilar to the first position.

The partition can be designed in particular to let through more operating medium between the proximal region and the distal region in the installation position E-E (as shown in the figures) of the container in the vehicle than in an oblique position S-S of the container with respect to the installation position E-E in the installed state.

Alternatively to the installation position E-E of the container, the position of the motor vehicle can also be used, wherein the oblique position is then a position dissimilar to the horizontal orientation (also called design position) of the motor vehicle. If the container is installed horizontally in the motor vehicle, the reference systems correspond.

In particular, the partition can be configured in such a manner that, in the mounted state of the container in a motor vehicle, the container lets through or can let through more operating medium between the proximal region and the distal region in a horizontal position of the motor vehicle than in a non-horizontal oblique position of the motor vehicle, as occurs, for example, in an oblique parking position of the motor vehicle. The partition can be designed to at least partially, preferably completely, prevent the throughflow of operating medium between the proximal region and the distal region in the oblique position S-S of the container or of the motor vehicle. In particular, the partition is designed to prevent at least an operating medium flow from the proximal region to the distal region during an oblique position S-S of the container or of the motor vehicle.

The partition can extend from the outer container bottom at least to such an extent in the direction of the upper side of the outer container that, in an oblique position S-S of the container or of the motor vehicle, the operating medium cannot pass beyond the upper edge of the partition from the proximal region into the distal region. The partition preferably extends at least in regions, preferably completely, from the outer container bottom as far as the upper side of the outer container.

The partition preferably comprises at least one double wall structure. The double wall structure can comprise at least two walls which are formed in parallel at least in regions. The double wall structure can in particular form a channel for the operating medium. The double wall structure therefore preferably forms an operating medium flow channel K through which operating medium can flow in the installation position of the container or in the horizontal position of the motor vehicle, whereas, in an oblique position of the motor vehicle or of the container, the flow through the flow channel is reduced or prevented.

The partition or double wall structure is preferably produced from an insulating material. The partition or double wall structure is particularly preferably manufactured from the same material as the outer container, particularly preferably by injection molding or blow molding.

In the installation position E-E, the partition preferably has a curved profile in the top view from above of the container or through a section through the container. The partition particularly preferably runs in a curved manner from one outer container side wall to a second outer container side wall and surrounds the at least one heating device here. Particularly preferably, the at least one heating device, the at least one pump device and/or the operating medium outlet are/is arranged centrally in the container. The operating medium can thus be particularly efficiently thawed. The partition preferably concentrically surrounds the heating device or pump device at least in regions. The partition is preferably arranged slightly spaced apart from the heating device. In the case of an annular heating device, for example, a distance between the heating ring and the barrier of approx. 1 to 20 cm, preferably 2 to 10 cm, can be provided.

At least two openings which are provided spaced apart from each other are preferably provided in the partition. The distance of the two openings from each other is preferably at least 0.5 L, preferably at least 0.75 L and particularly preferably at least 0.9 L, wherein L is the overall length of the partition. The first of the at least two openings is preferably a proximal opening which connects the proximal region to the channel of the double wall structure. Furthermore, the second of the at least two openings is a distal opening which connects the distal region to the channel of the double wall structure.

The openings are preferably positioned in the vicinity of the bottom. An interruption in the wall can also form the opening.

The partition can also have just one wall. For example, the outer wall can be a second wall which forms a channel in particular together with the one wall.

The at least two openings preferably point in different directions, in particular in such a manner that the openings have an angle greater than 135° and smaller than 225° (with respect to the centroid point of the proximal region and/or center of the tank flange).

The at least two openings can be provided at opposite ends of the partition or directly adjacent to said ends. The ends of the partition can be, for example, those regions of the partition at which the partition impacts against side regions of the outer container side wall.

In particular, the at least two openings can be arranged on opposite sides, in particular with respect to the heating device. The openings should preferably be positioned opposite each other (in opposition to each other).

An operating medium inlet or filling pipe preferably opens out in the proximal region, in particular in such a manner that operating medium can flow into the container if the operating medium has frozen in the distal region. The operating medium inlet preferably opens out directly adjacent to the at least one heating device. Directly adjacent means that the maximum distance between the operating medium inlet and the point of the heating device closest to it is at maximum 0 cm to 20 cm, preferably 0 cm to approx. 10 cm and particularly preferably 0 cm to approx. 5 cm.

The operating medium inlet can be produced from an insulating material and/or can have additional insulation. The operating medium inlet can furthermore have on the inside with respect to the insulation a heat conducting element which extends from the opening region of the operating medium inlet into the operating medium inlet. If the container has frozen and the heating device heats the operating medium directly adjacent to the heating device, a certain portion of the heat simultaneously easily enters the operating medium inlet, and therefore any ice layers in the operating medium inlet thaw more rapidly. A further sub-volume which thaws more rapidly can therefore be created locally. The at least one heat conducting element can be attached to and/or integrated on the inner wall. Alternatively, it can also project into the inner region. Furthermore, the heat conducting element can be connected to the heating device or can be part of the heating device. The operating medium inlet is preferably designed without a siphon.

The operating medium inlet can have at least one junction. The junction can be connected to at least one second inlet channel. The junction can preferably divide the inflowing operating medium flow into a plurality of partial flows, wherein at least one first partial flow opens out in the proximal region and a second partial flow opens out in the distal region in the container. In particular, the second inlet channel can open out in the distal region. The partition can be designed as a hydrostatic loop (see above) and/or as a surge tank. The partition preferably surrounds the at least one heating device. Such an operating medium inlet makes it possible for topped up operating medium to pass to the heating device and/or to the level sensor.

The technology disclosed here furthermore relates to a motor vehicle with at least one container for a liquid operating medium as is disclosed here. In particular, the container is installed in the motor vehicle in such a manner that the partition lets through more operating medium between the proximal region and the distal region in the installation position E-E of the container and in a horizontal position of the motor vehicle than in an oblique position S-S of the motor vehicle.

The technology disclosed here can also be described by the following aspects:

A. A container 100 for a liquid operating medium of a motor vehicle, comprising:
 an outer container 110 which forms a container volume 200, 300;
 at least one heating device 122 which is designed to thaw frozen operating medium; and
 a partition 140 which divides the container volume 200, 300 into a proximal region 200 and a distal region 300;
 wherein the proximal region 200 is arranged closer to the at least one heating device 122 than the distal region 300, and
 wherein the partition 140 is designed to let through more operating medium between the proximal region 200 and the distal region 300 in the installation position E-E of the container 100 than in an oblique position S-S of the container 100.
B. The container 100 as claimed in aspect A, wherein the at least one heating device 122 is completely arranged in the proximal region 200.
C. The container 100 as claimed in either of the preceding aspects, wherein the partition 140 by itself or together with an outer wall region of the outer container 110 surrounds the at least one heating device.
D. The container 100 as claimed in one of the preceding aspects, wherein the partition 140 extends from the outer container bottom 112 at least as far in the direction of the outer container upper side 114 that, in the oblique position S-S, the operating medium cannot pass beyond the upper edge of the partition 140, and/or
 wherein the partition 140 extends from the outer container bottom 112 as far as the outer container upper side 114.
E. The container 100 as claimed in one of the preceding aspects, wherein the partition 140 has at least one double wall structure 146, 148.
F. The container 100 as claimed in one of the preceding aspects, wherein the partition 140 has a curved profile.
G. The container 100 as claimed in one of the preceding aspects, wherein at least two openings 142, 144 are provided spaced apart from each other in the partition 140.
H. The container 100 as claimed in aspect G, wherein the at least two openings 142, 144 are provided at opposite ends or directly adjacent thereto.
I. The container 100 as claimed in one of the preceding aspects, wherein the at least two openings 142, 144 are arranged on opposite sides with respect to the heating device 122.

1. A container 100 for a liquid operating medium of a motor vehicle, comprising:
 an outer container 110 which forms a container volume 200, 300;
 at least one heating device 122 which is designed to thaw frozen operating medium;
 a partition 140 which divides the container volume 200, 300 into a proximal region 200 and a distal region 300, wherein the proximal region 200 is arranged closer to the at least one heating device 122 than the distal region 300; and
 an operating medium inlet 400 which opens out in the proximal region 200.
2. The container as claimed in aspect 1, wherein the operating medium inlet 400 opens out directly adjacent to the at least one heating device.
3. The container as claimed in aspect 1 or 2, wherein the operating medium inlet 400 is produced from an insulating material and/or has additional insulation.
4. The container 100 as claimed in one of the preceding aspects, wherein the operating medium inlet 400 on the inside has at least one heat conducting element which extends from the opening region of the operating medium inlet 400 into the operating medium inlet.
5. The container 100 as claimed in one of the preceding aspects, wherein the operating medium inlet 400 is formed without a siphon.
6. The container 100 as claimed in one of the preceding aspects, wherein the operating medium inlet 400 has at least one junction 410 which is connected to a second inlet channel 420, and wherein the second inlet channel opens out in the distal region 300.
7. The container 100 as claimed in one of the preceding aspects, wherein the partition is designed as a surge tank 130 which surrounds the at least one heating device.
8. The container 100 as claimed in one of the preceding aspects, wherein the partition 140 is designed to let through more operating medium between the proximal region 200 and the distal region 300 in the installation position E-E of the container 100 than in an oblique position S-S of the container 100.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
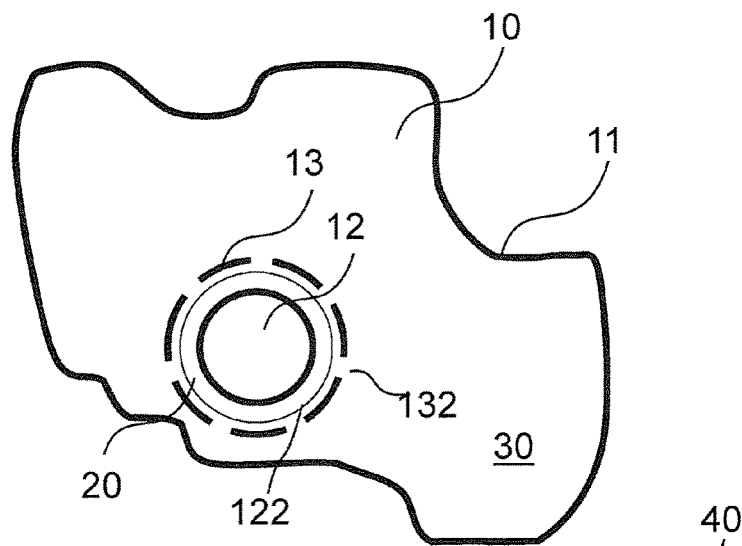
FIG. 1 shows a container according to the prior art in top view.

FIG. 1 shows a container according to the prior art as is shown, for example, in DE 10 2009 046 969 A1. The extraction unit (pump device) 12 is arranged centrally and is surrounded concentrically by the heating device 122. The surge tank 13 has openings 132 through which operating medium which is already liquefied can flow out of the interior or proximal region 20 into the outer or distal region 30 in which frozen operating medium is located.

Figure 2:
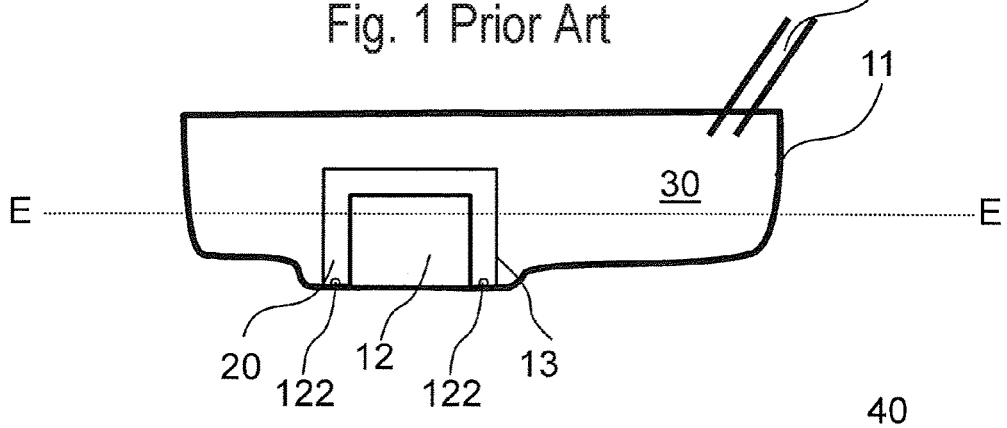
FIG. 2 shows a container according to the prior art in the installation position E-E.

FIG. 2 shows the prior art in a side view. The outer container 11 comprises the inner volume 20 and also the outer volume 30 which are separated from each other by the surge tank 13. The surge tank 13 is of insulating design and ensures that the heat generated by the heating device 122 passes only to a small extent, if at all, into the outer region 30. The operating medium inlet 40 is provided here on the container upper side and ends in the distal region 30. The surge tank 13 concentrically surrounds the heating device 122 which is provided in the inner region 20 adjacent to the pump device 12.

Figure 3:
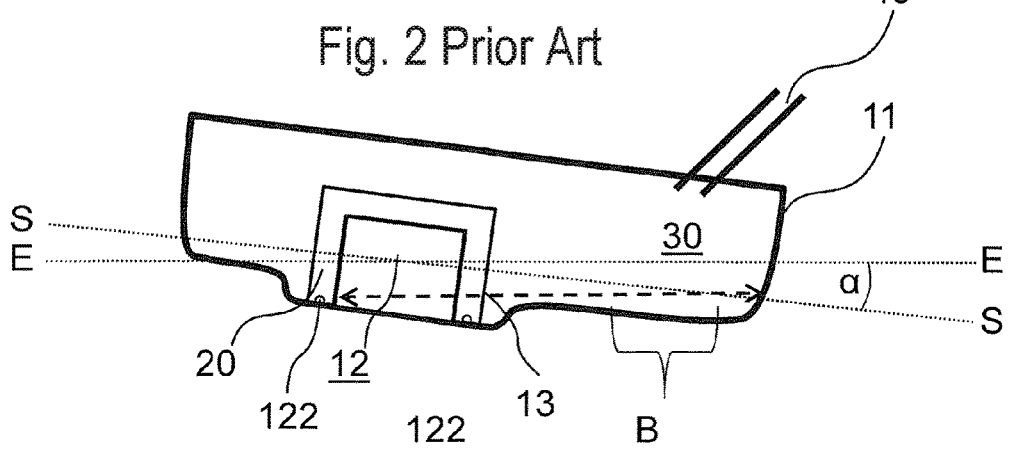
FIG. 3 shows a side view of the container according to FIG. 1 in an oblique position.

FIG. 3 shows the container according to FIG. 1 in the oblique position S-S. In this oblique position S-S, operating medium already liquefied in the inner region 20 flows through the opening 132 (cf. FIG. 1) into that region B of the distal region 30 which is spaced far apart from the heating device. In said outer region 30, most of the operating medium is frozen. The previously liquefied operating medium freezes in this region B during the duration of the parking. In the prior art illustrated here, the installation position E-E is identical to the horizontal orientation of the container 10.

Figure 4:
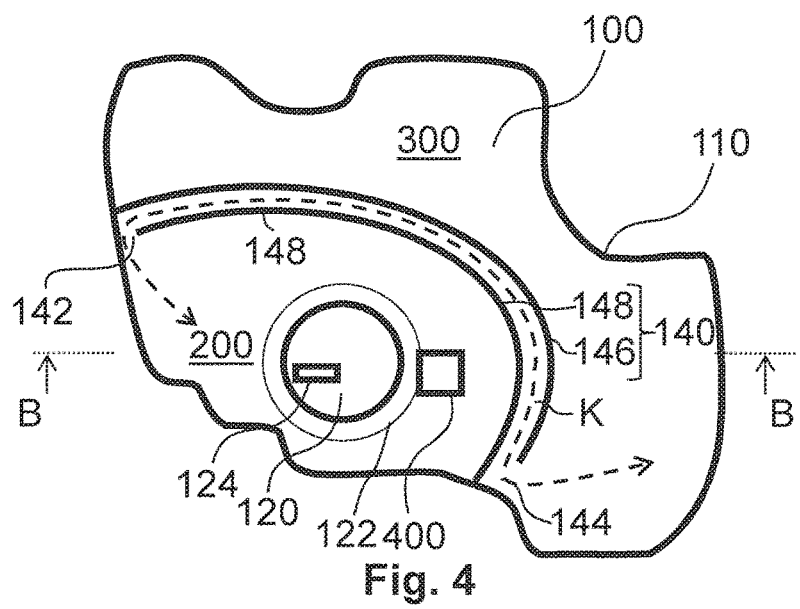
FIG. 4 shows a container 100 disclosed here in a top view from above.
Figure 5:
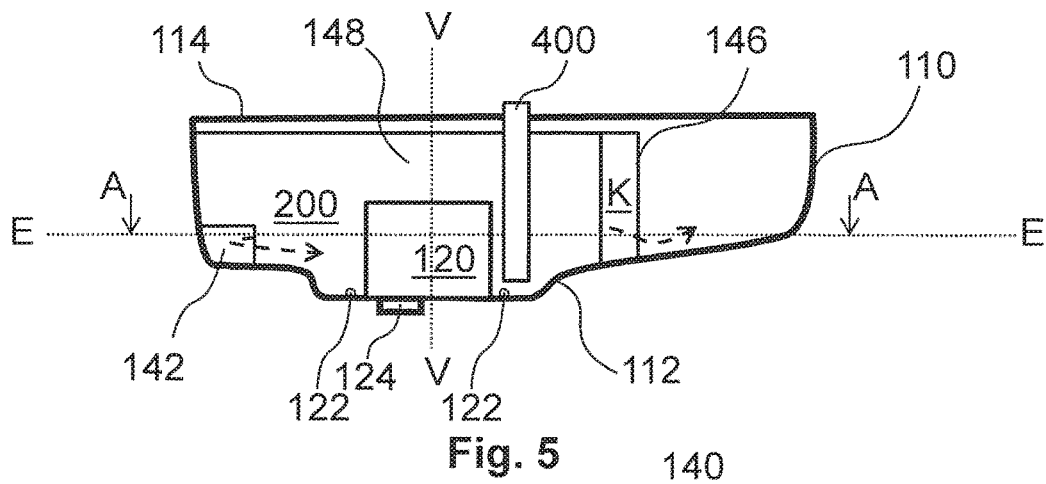
FIG. 5 shows a side view of the container 100 according to FIG. 4 in the installation position E-E.

FIG. 4 shows a container 100 according to the technology disclosed here. FIG. 4 shows a top view, and FIG. 5 shows a side view taken along the section B-B of FIG. 4. The outer container 110 surrounds the container volume 200, 300. A partition 140, formed from a proximal wall 148 and a distal wall 146, divides the container volume into a proximal region 200 and a distal region 300. A pump device 120 is arranged here in the proximal region 200. Furthermore, a heating device 122 is arranged in the proximal region 200. The heating device 122 heats the operating medium in the proximal region 200. If the operating medium has frozen in the proximal region 200, the heating device 122 thaws the operating medium. The operating medium outlet 124 of the container 100 is provided adjacent to the heating device 122. The operating medium outlet 124 is fluid-connected to a metering device (not illustrated). The proximal wall 148 and the distal wall 146 form a flow channel K through which, in the state of the container 100 mounted in a motor vehicle, operating medium can flow from the proximal region 200 into the distal region 300 if the vehicle is in a horizontal position. In the horizontal position, the operating medium can therefore flow through the proximal opening 142 in the proximal wall 148 into the channel K and can leave the latter through the distal opening 144 in the distal wall 146 (cf. FIG. 5). The hydrostatic loop(s) is/are connected into the barrier walls 146, 148 in the region of the container bottom preferably by the openings 142, 144 (opening diameter can be, for example, approx. 10 mm).

FIG. 5 shows a side view of the container 100 according to FIG. 4 along the section plane B-B. As is apparent from FIG. 5, in the neutral installation position E-E or in a horizontal orientation of the motor vehicle, the flow can pass through the channel in both directions since said channel is arranged approximately at the same level and essentially does not have any slope. The at least two openings are arranged here on opposite sides with respect to the heating device 120 (or with respect to a plane V-V through the longitudinal axis of the heating device 120) (i.e. on the right and on the left of V-V).

Figure 6:
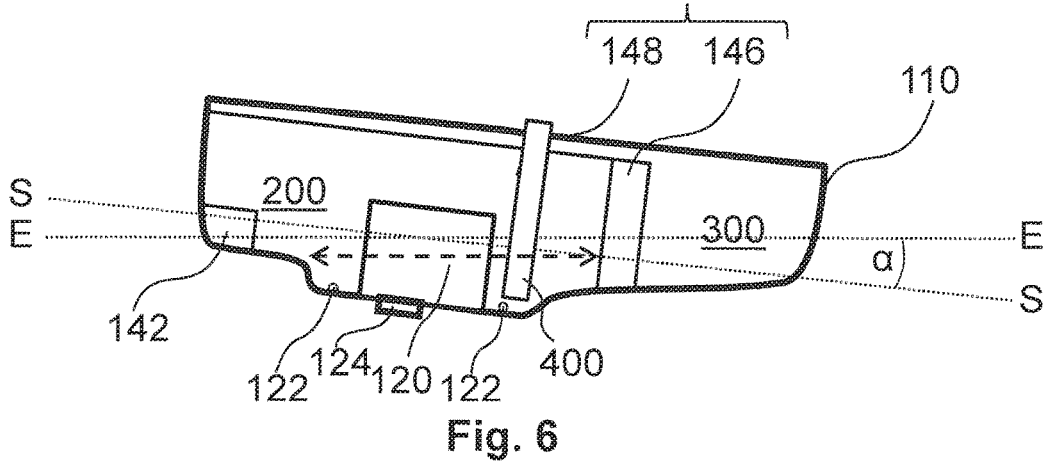
FIG. 6 shows the container 100 according to FIG. 4 in an oblique position S-S.

FIG. 6 shows the container 100 according to FIG. 4 in an oblique position S-S. In comparison to the installation position E-E or the horizontal orientation of the motor vehicle, the container 100 is tilted by an angle a with respect to the horizontal or with respect to the axis E-E. Such an oblique position occurs, for example, if the vehicle is parked with just one side on the curb or has been parked on any slopes. The barrier 140 prevents the operating medium from being able to leave the proximal space 200. The operating medium can move only in the proximal space 200. The barrier 140 prevents operating medium which is already liquefied from passing into the distal region 300. In particular, the liquefied operating medium does not pass to the opening 142, but rather remains in the region which is illustrated by the dashed double arrow. In the region 200, the heating device 122 can thaw operating medium comparatively rapidly enough since only a relatively small volume of ice in comparison to the entire container volume 200, 300 has to be thawed. Operating medium which has already thawed does not flow into the distal region 300 in which it could possibly freeze again. There is therefore not the risk that the heating wires of the heating device 122 will be exposed, which would considerably delay later thawing of the operating medium and would possibly also be associated with damage to the container.

Figure 7:
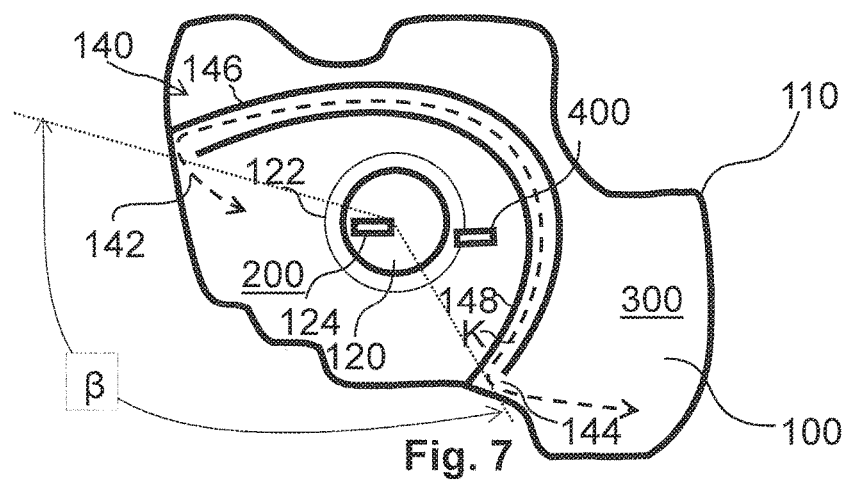
FIG. 7 shows a container 100 according to the technology disclosed here, in top view.

FIG. 7 shows a further container according to the technology disclosed here. Pump device 120, heating device 122, operating medium outlet 124 and also operating medium inlet 400 are arranged here substantially in the center of the container 100. The barrier 140 surrounds the heating device 122 here in a curved manner and concentrically at least in regions. The at least two openings 142, 144 are arranged here at an angle β (with respect to the centroid point of the region 200 and/or the center point of the pump device 120) which is approx. 135° to each other. However, other configurations of the barrier 140 are also contemplated as long as the blocking action is obtained in the oblique position S-S.

FIGS. 4 to 9 furthermore show at least one operating medium inlet 400. The operating medium inlet 400 is located in the proximal region 200. Operating medium can be poured through the operating medium inlet 400 directly adjacent to the heating device 120 even at low temperatures. In previously known solutions, the filling pipe 40 for the operating medium is provided in the upper region at a distance from the heating device. If the operating medium has frozen in the winter, operating medium cannot be topped up through the filling pipe. On the contrary, there has to be a wait until the container has completely thawed. If instead the filling pipe 400 is provided adjacent to the heating device 120, the operating medium in the operating medium inlet 400 is also liquefied even after a short operation of the heating device 120. Operating medium can therefore be simply topped up even during winter. The insulation measures and/or the heat conducting measures for the operating medium inlet 400 that can be provided are not illustrated. Said measures can help the operating medium initially only in the interior of the operating medium inlet 400 to be thawed without the surrounding operating medium in more remote regions outside the operating medium inlet 400 being thawed.

Figure 8:
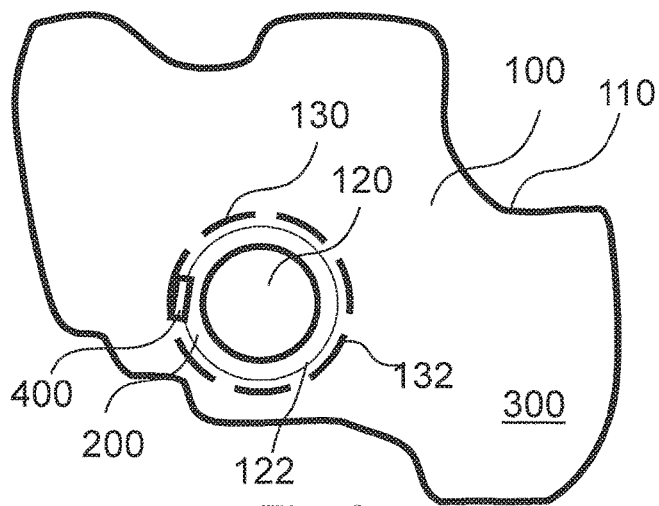
FIG. 8 shows a container 100 according to the technology disclosed here, in top view.
Figure 9:
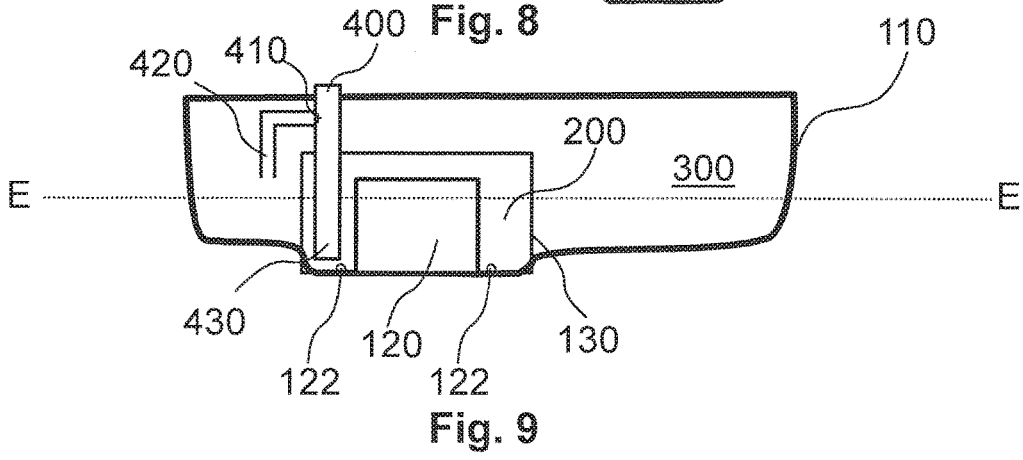
FIG. 9 shows a container 100 according to the technology disclosed here, in side view.

The operating medium inlet 400 in FIG. 9 has a junction 410. The junction separates the operating medium flow which flows into the operating medium inlet 400 into two partial flows. A first partial flow flows through a first inlet channel 430 into the proximal region, in a manner similar to that shown in FIGS. 4 to 8. A second partial flow passes through the second inlet channel 420, which is fluid-connected to the junction 410, into the distal region 300. It can therefore be ensured that both the proximal region 200 and the distal region 300 can be rapidly refilled with operating medium.

The solution described here for the operating medium inlet 400 is independent of the concept of the partition 140 of the container volume by means of a hydrostatic loop. In particular, such an operating medium inlet 400 can be used even in the case of conventional partitions 130, as is shown, for example, in FIGS. 8 and 9. In FIGS. 8 and 9, the container has a surge tank 130 which, for example, can include openings 132. The operating medium inlet 400 opens out here into the surge tank 130 in which liquefied operating medium can accumulate even at low temperatures. Any feed lines to the operating medium inlet have been omitted for the sake of simplicity. Furthermore, the solution of the hydrostatic loop is also independent of the operating medium inlet 400 disclosed here. However, the container 100 preferably include the operating medium inlet 400 disclosed here and the partition 140 disclosed here with the hydrostatic loop.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A container for a liquid operating medium of a motor vehicle, comprising:
an outer container which forms a container volume;
at least one heater configured to thaw frozen operating medium; and
a partition which divides the container volume into a proximal region and a distal region, wherein
the proximal region is arranged closer to the at least one heater than the distal region,
the partition is configured to let through more operating medium between the proximal region and the distal region in a flat position of the container than in a tilted position of the container,
the partition has at least one double wall structure, wherein the double wall structure forms a channel for the operating medium, and
at least two openings are provided spaced apart from each other in the partition, wherein a first of the at least two openings is a proximal opening which connects the proximal region to the channel, and wherein a second of the at least two openings is a distal opening which connects the distal region to the channel.

2. The container as claimed in claim 1, wherein the at least two openings are provided at opposite ends of the partition or directly adjacent the opposite ends of the partition.

3. The container as claimed in claim 1, wherein the at least two openings are arranged in different directions.

4. The container as claimed in claim 1, wherein
the at least two openings are arranged on opposite sides with respect to the at least one heater.

5. The container as claimed in claim 1, wherein
the at least two openings are arranged at an angle greater than 135° and less than 225° with respect to a centroid point.

6. The container as claimed in claim 1, wherein
operating medium can flow through the channel in the flat position of the container, whereas, in the tilted position of the container, flow through the channel is reduced and/or prevented.

7. The container as claimed in claim 1, wherein
a distance of the two openings from each other is at least 0.5 L, wherein L is the overall length of the partition.

8. The container as claimed in claim 7, wherein the distance is at least 0.75 L.

9. The container as claimed in claim 7, wherein the distance is at least 0.9 L.

10. The container as claimed in claim 1, wherein the openings are positioned in a vicinity of a bottom of the container.

11. The container as claimed in claim 1, wherein the at least one heater is completely arranged in the proximal region.

12. The container as claimed in claim 1, wherein
the partition by itself or together with an outer wall region of the outer container surrounds the at least one heater.

13. The container as claimed in claim 1, wherein
the partition extends from a bottom of the outer container at least as far in the direction of an upper side of the outer container so that, in the tilted position, the operating medium cannot pass beyond an upper edge of the partition.

14. The container as claimed in claim 13, wherein
the partition extends from the outer container bottom as far as the outer container upper side.

15. The container as claimed in claim 1, wherein the partition has a curved profile.

16. The container as claimed in claim 1, wherein the partition is produced from an insulating material.

* * * * *